United States Patent [19]

White et al.

[11] 3,781,852

[45] Dec. 25, 1973

[54] CALCULATOR DISPLAY CIRCUIT

[75] Inventors: Edward A. White, Fort Wayne, Ind.; James H. Bunting, Acton, Mass.

[73] Assignee: Bowmar Instrument Corporation, Fort Wayne, Ind.

[22] Filed: Nov. 21, 1972

[21] Appl. No.: 308,473

Related U.S. Application Data

[62] Division of Ser. No. 256,286, May 24, 1972.

[52] U.S. Cl. ........... 340/324 R, 340/172.5, 340/336

[51] Int. Cl. ........................................... G06f 3/14

[58] Field of Search .................. 340/324 R, 324 M, 340/336, 172.5; 235/92 EA; 315/109.5

[56] References Cited

UNITED STATES PATENTS

| | | | |
|---|---|---|---|
| 3,641,390 | 2/1972 | Nakamura | 340/324 R X |
| 3,646,544 | 2/1972 | Yamaguchi | 340/324 R |
| 3,676,656 | 7/1972 | Schmidt | 235/156 |

*Primary Examiner*—David L. Trafton
*Attorney*—John A. Young

[57] ABSTRACT

A display circuit for use in electronic calculator which includes a computing circuit for receiving and manipulating digital datum, the computing circuit including first means for repetitively generating a plurality of input signals individually in sequence and second means for repetitively generating a plurality of sequentially occurring groups of output signals with individual ones of the input and output signals occurring simultaneously, a plurality of input terminals, keyboard means for coupling the input terminals to receive selected ones of the input signals, means for generating a repeating clock pulse signal, and a power supply.

The display circuit comprises a plurality of luminescing display devices each of which includes a common element and a plurality of segment elements individually coupled to the common element and disposed in a geometric array corresponding to selected alpha-numeric characters. A plurality of digit driver amplifiers are coupled to the computing circuit to receive predetermined ones of the input signals and electrically in series with the predetermined ones of the common elements, and a plurality of segment driver amplifiers are coupled to the computing circuit to receive predetermined ones of the signals of said groups of output signals and connected electrically in series with all of the paralleled similar segment elements of all of said display devices. The digit driver amplifiers and segment driver amplifiers are rendered simultaneously and momentarily operative in response to the simultaneous reception of the input signals and groups of output signals with essentially all of the electrical energy passing through the segment and digit driver amplifiers, respectively, also passing through the display devices. The display devices are rendered individually, momentarily, and sequentially luminescent thereby.

11 Claims, 10 Drawing Figures

| D11 | D10 | D1 | D2 | D3 | D4 | D5 | D6 | D7 | D8 | D9 | |
|---|---|---|---|---|---|---|---|---|---|---|---|
| | 0 | 1 | 2 | 3 | 4 | 5 | 6 | 7 | 8 | 9 | KN |
| C | CE | | X | ÷ | | ± | ≡ | | | • | KO |
| | K | | | | | | | | | | KQ |
| | D | | | | | | | | | | DO |

CALCULATOR DISPLAY CIRCUIT

This application is a divisional application of copending application Ser. No. 256,286 filed May 24, 1972 entitled "CALCULATOR DISPLAY CIRCUIT" filed in the name of James H. Bunting and assigned to the same assignee as the present invention.

BACKGROUND OF THE INVENTION

1. Field of the Invention

The present invention relates to electronic calculators and in particular to an electronic calculator circuit which includes a novel power and space-conserving display circuit which is energized by the simultaneous occurrence of groups of repeating pulse signals. The position and the value of the digits displayed are determined by the concurrence and arrangement of the simultaneously occurring pulse signals.

2. DESCRIPTION OF THE PRIOR ART

Devices such as the abacus, slide rules, and the like which perform arithmetic manipulations such as adding, subtracting, multiplying, and dividing, are nearly as old as human history. Recent technology and in particular the development of semi-conductor devices have led to the development of the present day electronic computer, particularly binary digital computing or calculating machines. As this technology has advanced, electronic computing circuits have become faster, more accurate, and progressively smaller.

The effective utilization of digital computing circuitry, requires the use of compatible input and output equipment whereby a user can effectively communicate with the computer circuitry. Such prior art input-output equipment has not permitted miniturization and micro-miniturization and at the present time the input and output equipment of a typical computer or calculator represents a large portion of the bulk or size of such a device.

These input-output devices further typically require substantial amounts of power for operation. Correspondingly, the power supplies required to operate a complete electronic calculating circuit have themselves been large and bulky. It is for these reasons, i.e., the relatively large size and power requirements of the input-output equipment, the most electronic computing and/or calculating circuits have been designed for and are used at relatively fixed locations, and are too large to be conveniently hand held and operated.

It has, however, been long recognized that a computer or calculator, having small physical dimensions and low power requirements, which can be conveniently carried and hand held by a person and used wherever and whenever the need for the device arises would be of great value. It is this type of device, a small, portable, hand held, digital computer capable of performing the basic arithmetic manipulations and which is provided with physically small, low power input-output equipment, that is of particular interest with respect to the present invention.

SUMMARY OF THE INVENTION

Broadly, the present invention is an output or display circuit for use with a binary, electronic calculator. The calculator includes means for generating a repeating clock pulse signal at a predetermined repetition rate, a power supply, a computing circuit, and a novel display unit for displaying data entries and the results of arithmetic manipulations of the data. The computing circuit includes means for generating a plurality of repeating input signals individually in sequence and means for generating repetitively a plurality of sequentially occurring groups of output signals. Individual ones of the input signals and groups of output signals occur simultaneously. The computing circuit has a plurality of input terminals and a keyboard means for coupling the input terminals to the input-signal-generating means thereby to enter data and program instructions into the calculator circuit.

The display circuit comprises a plurality of luminescing display devices each of which includes a common member and a plurality of segments individually series coupled to the common member and disposed in a geometric array such that energization of a selected one or ones of the segments form selected alpha-numeric characters. The segments are rendered individually luminescent in response to a current passing therethrough and through the common member.

A plurality of digit driver amplifiers are coupled to the computing circuit to receive predetermined ones of the input signals and electrically in series with predetermined ones of the aforementioned common members. A plurality of segment driver amplifiers is coupled to the computing circuit to receive a predetermined one of the signals of said groups of output signals and connected electrically in series with all of the similar segments of all of the display devices. The digit driver amplifiers and segment driver amplifiers are rendered simultaneously and momentarily operative in response to said input signals and said groups of output signals, respectively, with essentially all of the electrical energy passing through the segment and digit driver amplifiers, respectively, passing through the display devices, the display devices being rendered individually and sequentially luminescent thereby.

In one embodiment of the invention, the display circuit further includes means for automatically turning "off" or "blanking" the display devices after a predetermined period of time between data entries. When the display devices are thus blanked, they impose substantially no load on the power supply.

In another embodiment of the invention, the display unit includes a novel "power-on" indicator which automatically illuminates one or more of the segments of one or more of the display devices whenever the remainder of the display devices are blanked. The particular segments which are energized by the "power-on" indicator circuit indicate that the calculator circuit is operative and imposes a minimum of power drain on the power supply. Also, this embodiment eliminates the need for additional power and space consuming indicators.

In yet another embodiment of the invention, for use with a portable calculator having a battery powered power supply, the display circuit is provided with means for indicating that the charge on the batteries is sufficient or insufficient to operate the calculator circuit. This charge indicator or "low voltage" indicator also energizes predetermined portions of one or more of the display devices whereby the power requirements for operating same are minimal and the need for additional indicating devices is obviated.

In a specific embodiment of the invention, the display devices are light-emitting diodes (LED's) which are pulsed "on" and "off" at a repetition rate of sufficient speed whereby the LED display units appear to be continuously illuminated. By using the simultaneous occurrence of a pair of pulsed signals to illuminate the LED display devices, the need for memory and scanning units in the display is obviated and the power and space requirements thereof are substantially reduced thereby enabling substantial miniturization thereof and enabling the device to be operated for substantial periods of time from a battery power supply using small, dry charge batteries.

It is therefore an object of the invention to provide an improved electronic calculator display circuit.

It is another object of the invention to provide such a display circuit having very low power requirements.

It is still another object of the invention to provide such a display circuit which includes means for automatically reducing the power requirments thereof after a predetermined period of time.

It is still another object of the invention to provide a display circuit wherein substantially all of the power is utilized to operate the display devices thereof.

It is an object of the invention to provide such a display circuit which includes means for indicating that the calculator is turned "on" during periods when the display devices are blanked.

It is yet another object of the invention to provide such a display circuit having a "power-on" indicator which utilizes elements of the display devices.

It is still another object of the invention to provide such a display circuit which includes means for indicating the level of charge on the batteries of a battery powered power supply used therewith.

It is yet another object of the invention to provide such a display circuit having a "charge" indicator circuit which utilizes the same display elements utilized for data display purposes.

It is still another object of the invention to provide a display circuit which can be operated from standard miniature batteries.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein.

DESCRIPTION OF A SPECIFIC EMBODIMENT

Figure 1:
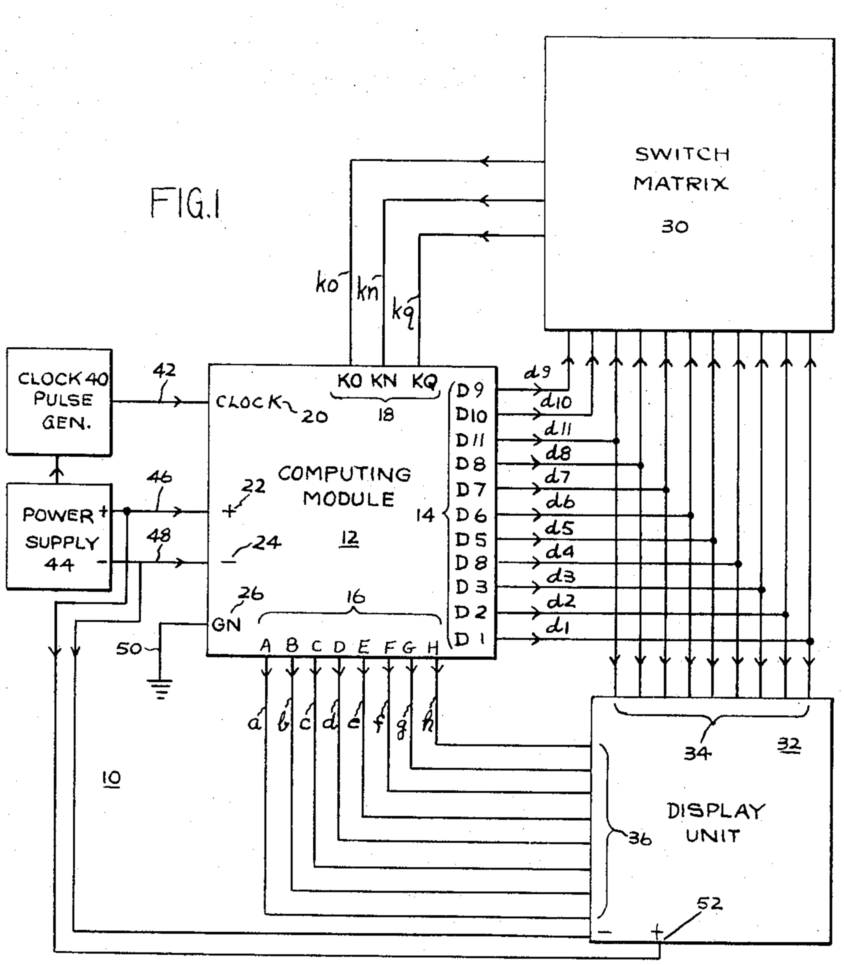
FIG. 1 is a block diagram of a calculator circuit incorporating the display circuit of the present invention.

Referring first to FIG. 1, there is illustrated in block diagram form a calculator circuit 10 which includes a computing module 12 in the form of an integrated circuit "chip" having a first group of input signal terminals 14 denoted as D1 through D11, a group of output terminals 16 denoted as A through H, a second group of three input terminal 18 denoted as KO, KN, and KQ, respectively, a clock pulse input terminal 20, positive and negative polarity power supply input terminals 22, 24, respectively, and a ground terminal 26. A keyboard switch matrix 30 is coupled between input terminals 14 and input terminals 18 via output signal lines d1 through d11 and input signal lines *ko*, *kn*, and *kq*.

Figure 7:
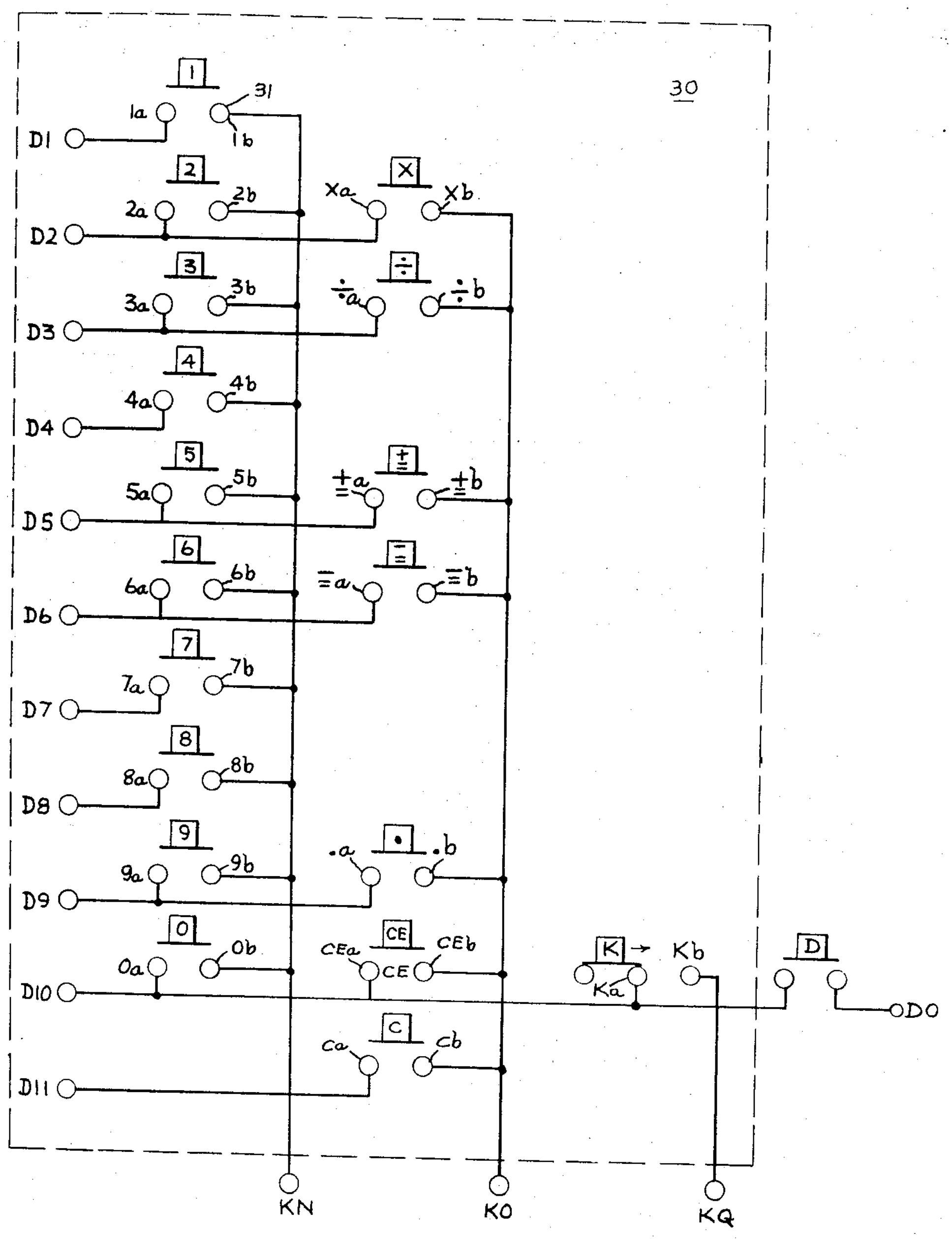
FIG. 7 is an electrical schematic of the keyboard switch matrix used with the calculating circuit.
Figures 9, 10:
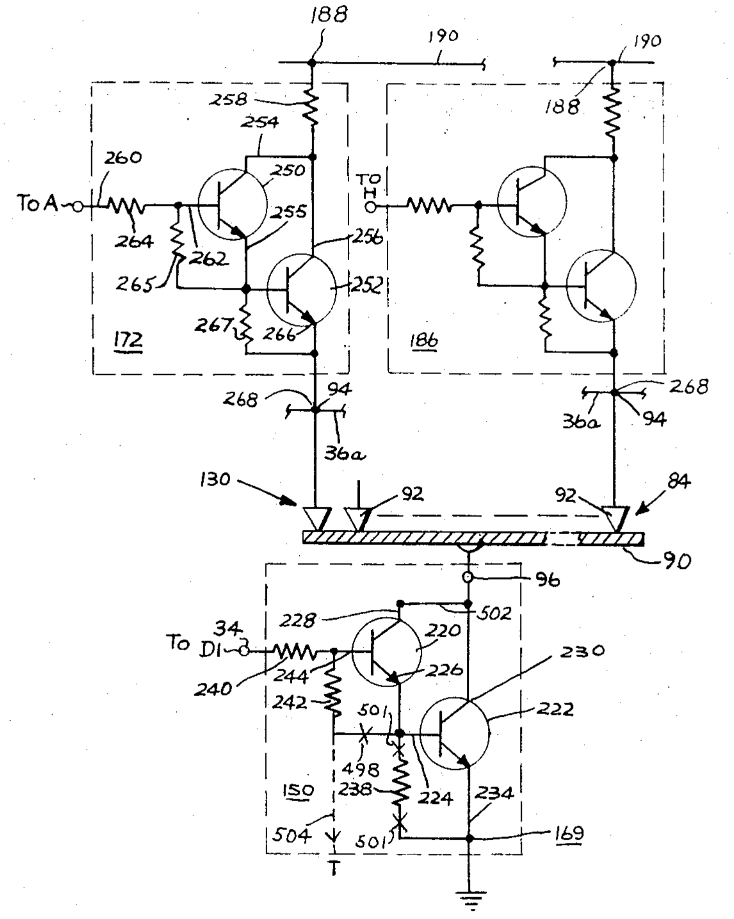
FIG. 9 is an electrical schematic of the segment driver amplifiers and digit driver amplifiers used in the display circuit.
FIG. 10 is a "truth" table for the switch matrix of FIG. 9.

As seen in FIGS. 7 and 10, switch matrix 30 comprises a plurality of normally open, single pole, single throw switches 1, 2, 3, 4, 5, 6, 7, 8, 9, K, D, CE, C, O, "." (decimal point), +=, ×, +, and −=. Closure of a predetermined one of the switches of switch matrix 30 completes an electrical connection between one of the input signal terminals 14 and one of the input terminals 18. The interconnection table for the switches of switch matrix 30 is shown in the table in FIG. 10.

A display circuit 32 includes a first group of input terminals 34 and a second group of input terminals 36 which are identified as digit position inputs and segment inputs, respectively, as will be explained in more detail below. Digit inputs 34 are connected individually to respective ones of input signal lines d1 through d8 and d11 and segment input terminals 36 are connected individually to predetermined ones of output terminals 16 of computing module 12.

A conventional clock pulse generator 40 is provided and generates a repeating pulse signal at a predetermined repetition rate, this repeating pulse signal being applied to the terminal 20 of computing module 12 via a clock pulse signal line 42. A power supply 44 generates positive and negative direct current (DC) operating voltages at predetermined voltage levels with the positive and negative voltages being applied via power supply busses 46, 48, respectively, to positive and negative power supply terminals 22, 24, respectively of computing module 12 and to display circuit 32. Ground terminal 26 is coupled by a suitable ground buss 50 to a suitable ground reference.

Before proceeding with the explanation of the computing circuit 12 and in view of the widespread use and the varied meaning of terms in the computer arts, a brief lexicon of terms will be given.

"Binary" refers to any number, signal, or circuit element which can have or assume one of two states these being typically "0" and "1" or "on" and "off".

A "digit" is one of the states.

A "bit" refers to a single binary digit.

A binary "word" is used to refer to a group of binary bits which together have an alpha-numeric significance, such as a decimal digit or an alphabetic character.

An "entry" is defined as a group of binary words or a decimal number which is a complete piece of data.

Figure 2:
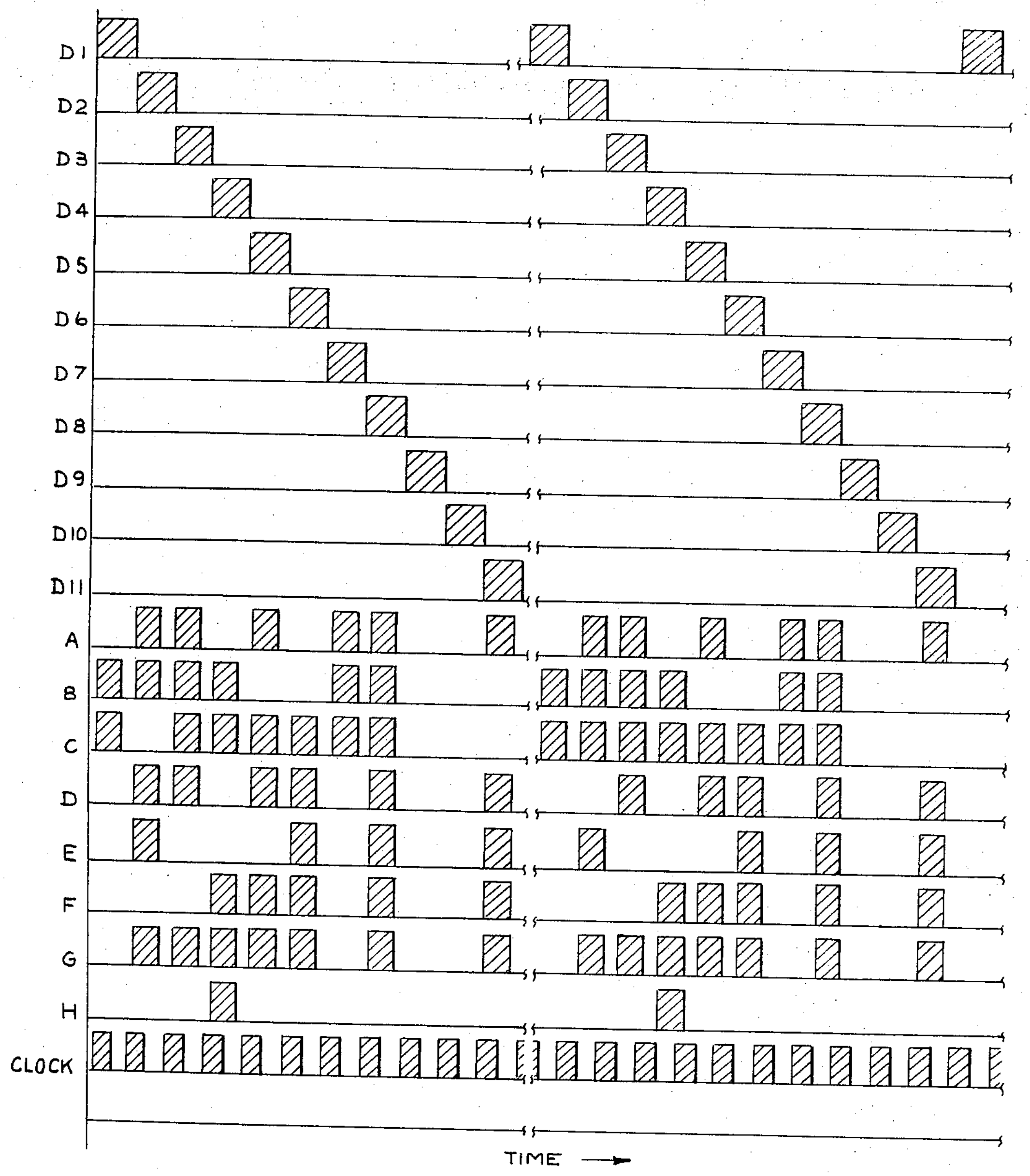
FIG. 2 is a chart showing the sequence in relationship of significant signals occurring at the terminals of the calculator circuit.

The operation of the computing module 12 which preferably is in the form of a single chip or integrated circuit will be understood from the following description of the signals applied to and appearing at the terminals thereof. Such a module is available as a single integrated circuit from Texas Instruments, Inc. and described in their Bulletin CB-143 (undated). Referring to FIG. 2 there is shown a chart which shows the sequence and time concurrence of the signals appearing at terminals 14 and at terminals 16 and the clock pulse signal applied to terminal 20. When the computing module 12 is energized and operating, it generates a plurality of sequentially occurring pulse signals which, for purposes of clarity are identified by the terminal designations D1 through D11 at which they appear. It will be observed that the signals D1 through D11 occur individually, that is, only one of the signals D1 through D11 is "on" or positive at any one time, all of the remaining ones of signals D1 through D11 being "off". The signals D1 through D11 occur in sequence and after each of the signals has occurred, the signals repeat, again occurring individually and in the same sequence.

The signals D1 through D11 appearing at terminals 14 are applied to keyboard switch matrix 30. All of the switches of switch matrix 30 are manually operable by means of push buttons on a keyboard and are normally open. Therefore, none of the signals D1 through D11 applied thereto from computing module 12 normally pass therethrough to output signal lines *ko*, *kn*, and *kq*. However, when a particular one of the switches of switch matrix 30 is closed, it completes a connection between a predetermined one of input signal lines d1 through d11 and a predetermined one of output signals lines *ko*, *kn*, and *kq*. The actual connections are as shown in the table of FIG. 10. For example, closure of switch "2" connects input signal lines *d2* and correspondingly couples input signal terminal *d2* to output signal line *kn* and input terminal KN. Further closure of switch "*x*" completes a connection between input signal line *d2* and input line *ko*.

Switches "0 , 1, 2, 3, 4, 5, 6, 7, 8, and 9," are data entry switches and switches "C, CE, ×, +, +=, ".", and K," are function or program control switches. Each switch is operated by a push button or a keyboard (not shown), these push buttons being shown diagrammatically. Closure of one or more of switches 0 through 9 will effect the entry of numerical data and closure of one of switches "C, CE, ×, +, +=, ".", and K" effects the entry of a program instruction into computing module 12. Switch D performs a separate function to be explained below. Coding of the input signals is performed internally of the computing module 12 in a manner which need not be explained here. It is important, however, to note that identification of the switch is a function of the time at which the particular input signal D1 through D11 occurs. For this reason, whenever one of the switches of matrix 30 is closed, it must remain closed for a period of sufficient duration for all of the input signals D1 through D11 to occur. In actual practice, signals D1 through D11 occur at a very fast repetition rate whereby the required closure time of the push button switches of matrix 30 is on the order of a few milliseconds.

The keyboard mounting of the push buttons (FIG. 7) corresponds to the keyboard of a conventional mechanical adding machine or calculator, depression of one of the push buttons causing momentary closure of a respective one of the switches of FIG. 7. The push buttons are spring biased to hold the corresponding switches normally open.

Simultaneously, with the occurrence of each of the input signals D1 through D11, computing module 12 generates a "group" of signals at its output terminals A through H. Each "group" comprises the ones of signals A through H which are "on" simultaneously with each of signals D1 through D8 and D11. These signals, which are again identified by the same designation as the terminals at which they appear, are shown in FIG. 2 as signals A through H, (each "group" being in a vertical column; i.e., one group being B and C, another group being A, B, D, E, and G, etc.). In a specific example, a group of "on" or positive signals appear at output terminals B and C simultaneously with the occurrence of an input signal D1. Simultaneously with the occurrence of input signal D2, a group of "on" signals appear on output terminals A, B, D, E, and G. Similar groups of signals are shown occurring at output terminals A through H simultaneously with the occurrence of input signals D3 through D11. Each group of signals, i.e., the signals appearing at terminals A through H simultaneously with one of the input signals appearing on terminals D1 through D11, are coded in accordance with a predetermined scheme for a purpose to be explained in more detail below.

Simultaneously with the occurrence of input signals D1 through D11 and output signals A through H, clock pulses identified as "clock" in FIG. 2 are applied to clock pulse input terminal 20. As is well known to those skilled in the art, these clock pulses key or gate each operation of the computing module 12. The clock pulses occur at a fixed and relatively high repetition rate of several hundred to several thousand pulses per second depending upon the internal switching speed of the computing module 12 whereby it will be apparent that the above described sequence of signals D1 through D11 and A-H also occur at a very rapid repetition rate.

Still referring to FIG. 2, it will be observed that the signals A through H are shown to repeat. That is, the group of output signals A through H, e.g., the particular ones of signals A through H which occur simultaneously with input signal D1 are the same each time input signal D1 occurs. This, however, is true only until a different data entry is made, e.g., switch 2 is closed to insert a new data entry. During actual operation of the computing module 12, the signals A through H conform to a coded output signal which corresponds to the value of either a data entry or as a result of manipulated data entries within the computing module 12. It will be apparent that the data entries will be changed with each switch operation, and the result of manipulated data entries will also change. Thus, each time a new data entry is entered (different switch is operated) into the computing module 12 or a new manipulation on the data is performed within the computing module 12, the particular coding or array of the output signals A through H will change accordingly.

It will now be apparent that the output signals from the calculator chip 12 are dynamic. That is, the signals appearing at terminals 14 and 16 are in constant state of change. Stated otherwise, the output signals on terminals 14 pulse "on" and "off" repetitively and in sequence. The output signals on terminals 16 similarly are generated as sequential groups, the groups occurring sequentially and each group being a code for the decimal digit equivalent of a data entry or result in computing module 12. Each group of signals is "on" momentarily, goes "off", and is then replaced with a subsequent "on" group.

Figure 4:
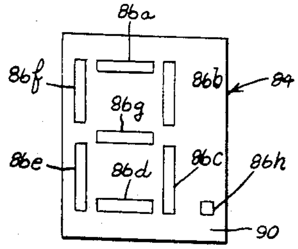
FIG. 4 is a diagram showing the arrangement of the segment elements of a typical display device.

Referring to FIG. 4, there is shown the typical layout of a light emitting diode (LED) alpha-numeric display "chip" 84. The "chip" includes a plurality of separate segments 86*a*, 86*b*, 86*c*, 86*d*, 86*e*, 86*f*, 86*g*, and 86*h*. Each segment 86*a* through 86*h* can be selectively illuminated or extinguished. Segments 86*a* through 86*h* are arranged in physical array as shown such that illumination of predetermined combinations of the segments 86*a* through 86*g* will form most alpha-numeric characters, i.e., the ten decimal digits 0 through 9 and alphabetical characters such as "A", "B", "E", "L", etc. The segment 86*h* provides a means for displaying a decimal point. Thus, each of segments 86*a* through 86*h* may be said to form one of the elementary segments of most alpha-numeric characters.

Figure 3:
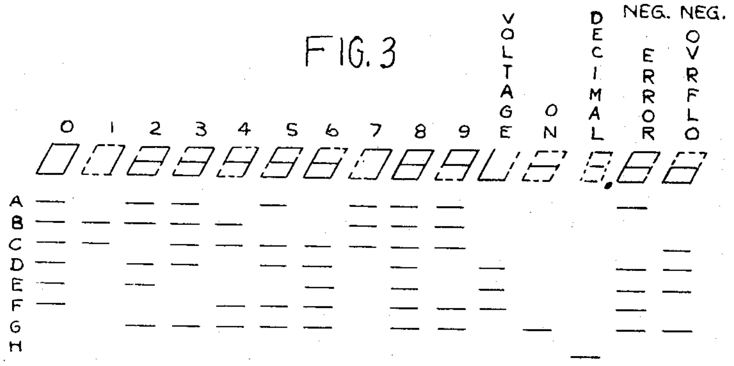
FIG. 3 is a table showing the code of the output signals generated by the computing circuit.

It will now be seen that each vertically aligned group of signals A through H (FIG. 2) is coded to provide the necessary combination of signals to activate the proper segments 86*a* through 86*h* to form a particular alpha-numeric character. The output code is shown in FIG. 3.

With the signal combinations that will be generated at output terminals A through H for the present application providing each of the digits 0 through 9, decimal point, and alphabetic characters "E", "L", "—", and "□". For example, the decimal digit "0" is formed by segments 86*a*, 86*b*, 86*c*, 86*d*, 86*e*, and 86*f*. The decimal digit "1" will be formed by segments 86*b* and 86*c*, and the alphabetic character "E" which, for example, may be used to signify an error, will be formed by segments 86*a*, 86*d*, 86*e*, 86*f*, and 86*g*.

Figure 5:
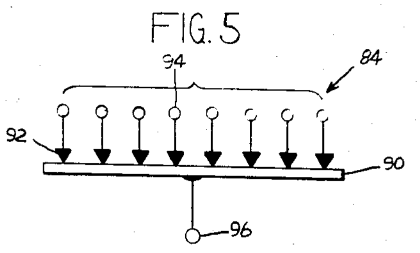
FIG. 5 is a diagrammatic illustration of a typical display device.

As best seen in FIG. 5, each of LED chips 86*a* through 86*h*, includes a conductive substrate 90 which functions as a common cathode, and eight anodes as at 92. The application of a positive voltage potential between an anode terminal, such as anode 92 and common cathode terminal 90 will cause the anode to glow. Cathode 90 has a physical shape as shown in FIG. 4, typically rectangular and each of the anodes 92 has the physical configuration of one of the segments 86*a* through 86*h* of the "chip" shown in FIG. 4. Thus it will be seen that application of a proper voltage potential across predetermined ones of terminals 94 and 96 will produce an illuminated display having outlines of the selected alpha-numeric characters. Thus, anodes 92 are each synonymous with a particular one of the segments 86*a* through 86*h* and hereinafter will be referred to as the latter.

Figure 6:
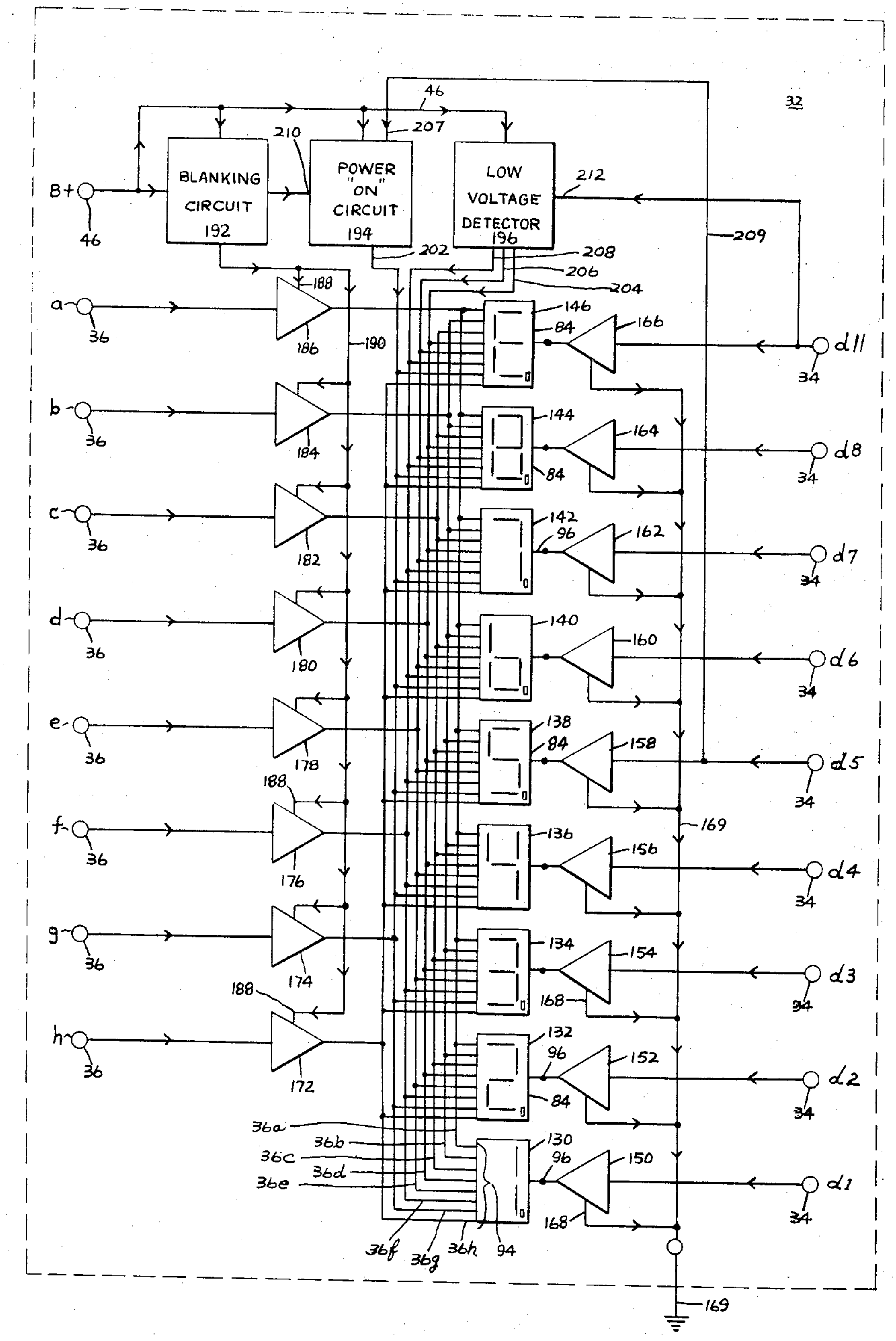
FIG. 6 is a block diagram showing the internal elements of the display circuit.

In FIG. 6, there is shown a block diagram of the display unit 32 which includes a group of nine display devices or chips 130, 132, 134, 136, 138, 140, 142, 144, and 146. Each of display devices 130 through 146 comprises an LED chip 84 as described above, whereby each device 130 through 146 includes a plurality of input terminals 94 and a common terminal 96.

Coupled between the common terminals 96 of display devices 130 through 146 and input signal lines d1 through d8 and d11 via terminals 34, respectively, is a group of digit driver amplifiers 150, 152, 154, 156, 158, 160, 162, 164, and 166. Each of digit driver amplifiers 150 through 166 includes a common load output terminal as at 168 coupled in common to ground as at 169.

All of the similar elements or segments of all of the devices 130 through 146 are coupled in common. That is, all of the segments 86*a* are connected together via a buss 36*a*, all of the segments 86*b* are coupled together via a buss 36*b*. Similarly, all of the similar segments 86*c* through 86*h* are connected in common via busses 36*c* through 36*h*, respectively. Coupled between busses 36*a* through 36*h* and output signal lines "*a*" through "*h*" are a plurality of segment driver amplifiers 172, 174, 176, 178, 180, 182, 184, and 186, respectively. Each of segment driver amplifiers 172 through 186 is provided with a load input terminal as at 188, all input terminals 188 being connected in common to a supply buss 190.

A blanking circuit 192 is coupled in series between supply buss 190 and power supply buss 46. Also coupled to power supply buss 46 is a "power on" circuit 194 and a low voltage detector circuit 196.

"Power-on" circuit 194 has a control signal input terminal 210 coupled to blanking circuit 192 and a single output terminal 202 which is coupled to segment buss 36g.

Low voltage detector 196 is provided with three output signal lines 204, 206, and 208 which are coupled to segment busses 36*d*, 36*e*, and 36*f*, respectively.

In operation, blanking circuit 192 is operable between "on" and "off" conditions wherein it connects and disconnects, alternately, supply buss 190 to power supply buss 46.

Segment driver amplifiers 172 through 186 are similarly operable between "on" and "off" conditions, they being rendered "on" in response to reception of respective ones of signals A through H via input terminals 36 and rendered "off" in the absence thereof. When segment driver amplifiers 172 through 186 are "on" they complete an electrical path between their load input terminals 188 and respective ones of segment busses 36*a* through 36*h*, *respectively*.

Thus, assuming that blanking circuit 192 is "on" a supply voltage will be applied to the input terminals 188 of segment driver amplifiers 172 through 186 via supply buss 190. The reception of a respective one of signals A through H by respective ones of segment driver amplifiers 172 through 186 will in turn couple the supply potential on supply buss 190 to the respective one of segment busses 36*a* through 36*h* thereby applying the supply potential to the respective segments 86*a* through 86*h* of display devices 130 through 146.

Digit driver amplifiers 150 through 166 are also operable between "on" (conductive) and "off" (non-conductive) conditions. When in an "on" condition, the digit driver amplifiers complete an electrical circuit between their terminals 96 and ground buss 169 and, conversely, when in an "off" condition, disconnect the respective input terminals 96 from ground buss 169. These amplifiers are rendered "on" and "off", respectively, in response to reception of and absence of one of signals D1 through D8 and D11 at input terminals 34.

To complete an electrical circuit through a particular one of the segments 86a through 86h of display devices 130 through 146, it is necessary that blanking circuit 192 be "on", the particular amplifiers 172 through 186 coupled to the segment be "on", and the particular amplifiers 150 through 166 coupled to the display devices 130 through 146 must be "on".

Since input signals D1 through D11 occur individually in sequence, it will now be apparent that only a single one of the digit driver amplifiers 150 through 166 will at any one time be in an "on" condition. It will also be apparent that a particular coded group of signals A through H will render predetermined ones of amplifiers 172 through 186 "on" at any one time.

For example, using the particular signal sequence shown in FIG. 2, it will be seen that upon the occurrence of signal D1, there simultaneously occur output signals B and C. Correspondingly, these signals render digit driver amplifier 150 "on" (conductive) and segment driver amplifiers 182 and 184 "on" (conductive). The remaining digit driver amplifiers 152 through 166 remain "off" (non-conductive) and the remaining segment driver amplifiers 172 through 180 and 186 will remain "off" (non-conductive). Under these conditions, and assuming that blanking circuit 192 is "on" (conductive), supply potential will be applied to segments 86*b* and 86*c* of display device 130 and common terminal 96 thereof will be coupled to ground. This in turn will produce a flow of current through segments 86*b* and 86*c* of display device 130 thereby illuminating these segments to thereby display the decimal digit 1.

In a similar manner during the occurrence of signals D2 through D8 and D11, and using the output signal groups as shown in FIG. 2, the digits 2, 3, 4, 5, 6, 7, 8, and the alphabetic character "E" will be displayed on display devices 132 through 146, respectively.

Thus it can be seen that the illumination or display of a particular digit on a particular one of display devices 130 through 146 is the result of the simultaneous reception of a particular one of the input signals D1 through D8 and D11, a particular group of the output signals A through H, and when blanking circuit 192 is "on".

When blanking circuit 192 is "off", no supply potential will appear on supply buss 190 whereby no supply potential will be applied to the display devices 130 through 146 irrespective of the presence or absence of input signals D1 through D8 and D11 and output signals A through H.

"Power-on" indicator circuit 194 is operative between an "on" (conductive) and "off" (non-conductive) condition. When "on", indicator circuit 194 completes an electrical circuit between supply buss 46 and its output terminal 202. When "off", circuit 194 disconnects output terminal 202 from supply buss 46. Indicator circuit 194 further includes a control signal input terminal 207 which is coupled via a signal line 209 to input signal line *d*5 via the appropriate digit driver input terminal 34. Indicator circuit 194 is also connected to blanking circuit 192 via a second control signal input terminal 210. In operation, indicator circuit 194 is rendered "on"in response to the simultaneous reception of signals on its first and second control signal input terminals 207 and 210. The control signal appearing at second control signal input terminal 210 from blanking circuit 192 appears whenever blanking circuit 192 is in an "off" condition and is absent at all other times. A signal will appear at first control signal input terminal 207 whenever input signal D5 occurs.

In operation, whenever blanking circuit 192 is rendered "off", there is applied a signal via input terminal 210 to indicator circuit 194. Input signals D5 are continuously and repetitively applied to input terminal 207, this signal being a repeating pulse as described above. Under these conditions, power-on circuit 194 will be rendered "on" intermittently in synchronism with the occurrence of input signal D5. Conversely, when blanking circuit 192 is in an "on" condition, no signal appears at second control signal input terminal 210 of power-on circuit 194 whereby indicator circuit 194 remains in an "off" condition irrespective of the occurrence of the input signals D5.

Output terminal 202 of circuit 194 is connected to buss 36g. Thus, it will now be apparent that whenever blanking circuit 192 is "off", circuit 194 will be rendered intermittently "on" thereby applying B+ potential from supply buss 46 to buss 36*g*. This in turn applies supply potential to all of the segments 86*g* of the display devices 130 through 146, this potential appearing in synchronism with the occurrence of the input signal D5.

Input signal D5 is simultaneously applied to digit driver amplifier 158 rendering it intermittently "on". This "on" condition is seen to occur simultaneously with the application of the supply potential to the segment 86*g* of display device 138, whereby the segment 86*g* thereof is rendered luminescent. It will be noted that when this condition occurs, all of the remaining display devices are extinguished or turned "off" by reason of the blanking circuit 192 being in an "off" condition. Thus, the circuit 194 provides a visible indication that the calculator circuit 10 is operative whenever the display devices 130 through 146 have been rendered inoperative by means of blanking circuit 192. It will of course be obvious that no "power-on" indication is required when the blanking circuit 192 is in an "on" condition since under these circumstances, one or more digits will be visibly displayed by the display devices 130 through 146, thereby making it obvious that the calculator circuit is operative.

Low voltage detector 196 includes internal circuitry to be explained in detail below which senses the voltage level on supply buss 46. Detector 196 is also operative between an "on" (conductive) and "off" (non-conductive) condition, the detector being rendered "off" when the supply potential on supply buss 46 is above a predetermined voltage level and rendered "on" when this voltage potential is below said predetermined level.

Low voltage detector 196 further includes an input terminal 212 which is coupled to receive input signals D11 via one of terminals 34 from input signal line d11.

In operation, detector 196 output terminals 204, 206, 208 are coupled to the supply buss 46 whenever input signal D11 is received at its control signal input terminal 212 and under the condition that the voltage on supply buss 46 is below the aforementioned predetermined level.

Under the above stated conditions, low voltage detector 196 will apply the supply voltage on buss 46 to segment busses 36*d*, 36*e*, and 36*f*. This will occur only during th period input signal D11 is applied to digit driver 166. Correspondingly, whenever the voltage on supply buss 46 falls below the predetermined voltage level, specifically, the voltage level required for proper operation of the calculator circuit, a repeating pulse signal will be applied to segment busses 36*d*, 36*e*, and 36*f*, which, in conjunction with the occurrence of input signal D11, will cause segments 86*d*, 86*e*, and 86*f* of display device 146 to be illuminated thereby defining the alphabetic character "L" which, in this instance is used to indicate a low voltage battery condition.

Each of digit driver amplifiers 150 through 166 is identical and therefore only the operation of a single driver amplifier, i.e., digit driver 150, will be explained. Referring to FIG. 9 there is shown an electrical schematic which includes digit driver amplifier 150 which has first and second transistors 220 and 222. The base 224 of transistor 222 is connected to the emitter 226 of transistor 220. The collector 228 is connected to cathode 96. The collector 230 is connected to the cathode 96 of the display device 130. The emitter 226 of transistor 220 is connected to base 224 and to ground buss 169 via a resistor 238. A pair of resistors 240, 242, are coupled between base 244 and control signal input terminal 34 and base 224, respectively.

In operation, transistor 220 is normally non-conductive and functions as a control transistor which receives input signal D1. Transistor 220 is forward biased by means of an "on" condition of the respective one of segment driver amplifiers 172 through 186 whereby, when signal D1 occurs, it will be rendered conductive. When transistor 220 becomes conductive, it in turn renders transistors 222, normally non-conductive, conductive thereby coupling substrate 90 of chip 130 to ground buss 169. Transistor 222 can thus be considered as a load transistor and the current path through its collector and emitter 230, 234 as a load circuit. It will be observed that the current flowing through transistor 222 will be substantially greater than the current flowing through transistor 220, the current flowing through transistor 220 providing only the base current for transistor 220 plus a small additional current load which flows through biasing resistor 238, the latter resistor being selected to have a relatively high impedance to minimize this current loss. Since the only useful current flowing through the digit driver amplifier 150 is that current which flows through the display device 130, it will now be apparent that this circuit configuration optimizes the utilization of power supply energy since substantially all of the current flowing therethrough flows through the load circuit of transistor 222 which current in turn is the current flowing through the display device 130.

Each of the segment drivers 172 through 186 is identical and again a description of one, i.e., segment driver amplifier 172, will suffice for all.

A typical segment driver amplifier 172 is shown schematically in FIG. 9 and includes first and second segment driver transistors 250 and 252 which are coupled together in a "Darlington" configuration. Specifically, the collectors 254, 256, of transistors 220, 222 are coupled in common and to supply buss 190 via a load resistor 258. Segment driver 172 has a control signal input terminal 260 which is one of the display input terminals 36 and which is coupled to the base 262 of transistor 250 via a resistor 264. A biasing resistor 265 is coupled between the base 262 and emitter 266. Emitter 266 also has connected thereto output terminal 268.

The circuit path through resistors 258, collector 256 and emitter 266 will be considered as a load circuit, and transistor 252 as a load transistor, while the circuit through the collector 254 and emitter 255 of transistor 250 may be considered as a control circuit and transistor 250 as a control transistor. In this circuit, transistor 250 is normally non-conductive and is rendered conductive ("on") in response to a respective one of the signals A through H applied to the base 262 via input terminal 260 and resistor 264. Conduction of transistor 250 in turn renders transistor 252 (normally non-conductive) conductive thereby applying the B+ potential on supply buss 190 to the anodes 92 (FIG. 5 only) of the respective display device 130. In this circuit, it will be observed that all of the current flowing through the load circuit and all of the current flowing through the control circuit flows outwardly via output terminal 268. This current includes both the current resulting from the current flow from the supply buss 190 and current flowing through control transistor 250 and the biasing network (resistors 264, 265) coupled to the base thereof, the latter current resulting from the occurrence of the signal A. Thus, all of the current utilized for self-operation and that flowing through the segment driver amplifier 172 flows outwardly via output terminal 268 and through the display device 130, and therefore, all of the current flowing through the segment driver amplifier is utilized to illuminate the display device 130 thereby minimizing power loss and the power load on the power supply.

Recapitulating, positive signals are appearing repetitively on output terminal groups 14 and 16 as described above. It can now be seen that the occurrence of signals D1 through D8 and D11 in succession render the transistors 220, 222 of digit drivers 150 through 166 conductive. This couples the respective ones of the "chip" substrates 90 to ground buss 169 via the collector-emitter circuit of transistors 222.

Simultaneously, different combinations of signals are appearing in sequence at output terminals A through H of group 16. Positive signals occurring on particular ones of the output terminals A through H will be applied to the respective input terminals 260 of the segment driver amplifiers 172 through 186 coupled thereto.

Thus it is seen that the simultaneous occurrence of an individual one of the output signals at terminals D1 through D8 and D11 and a combination of signals on output terminals A through H results in the illumination of a particular array of segments 86*a* through 86*h* of one of the "chips" 130 through 146. The segments of only one of the "chips" 130 through 146 will be illuminated at any instant since only one of the "chips" will at any instant be coupled to ground by the digit drivers 150 through 166.

"Chips" 130 through 146 will remain illuminated only for a period of time equal to the time duration of the overlapping portions of the signals appearing on the terminals of group 14 and the terminals of group 16. In actual operation, this time duration is very short whereby each of the digits is only illuminated for a brief period of time in response to each combination of signals. The repetition rate of the signals appearing on the output terminals of group 14 and the terminals of group 16 is at a rate such that the "on-off" cycling or illumination and non-illumination of the "chips" 130 cannot be perceived by the human eye. Correspondingly, the digits appearing at each of the "chips" 130 through 146 appear to be continuously illuminated.

Nonetheless, "chips" 130 are in fact only illuminated for a very brief period and only one "chip" is illuminated at any one instant. Correspondingly, the maximum power load required by all the "chips" is no greater than the load for a single "chip". Further, the total power consumption of each "chip" is substantially reduced since it is only turned "on" for a very brief period of time. Thus it is seen that the use of pulse display "chips" which are energized by the simultaneous occurrence of a pair of concurrently occurring pulsed signals substantially reduces the power requirements and power consumption of the display device. This in turn substantially reduces the size and energy requirements and increases the life expectancy of a battery used to energize the display. Further, essentially all of the current flowing through segment driver amplifiers 172 through 186 and digit driver amplifiers 150 through 166 flows through the display devices 130 through 146, further conserving the power drain on the power supply batteries.

Figure 8:
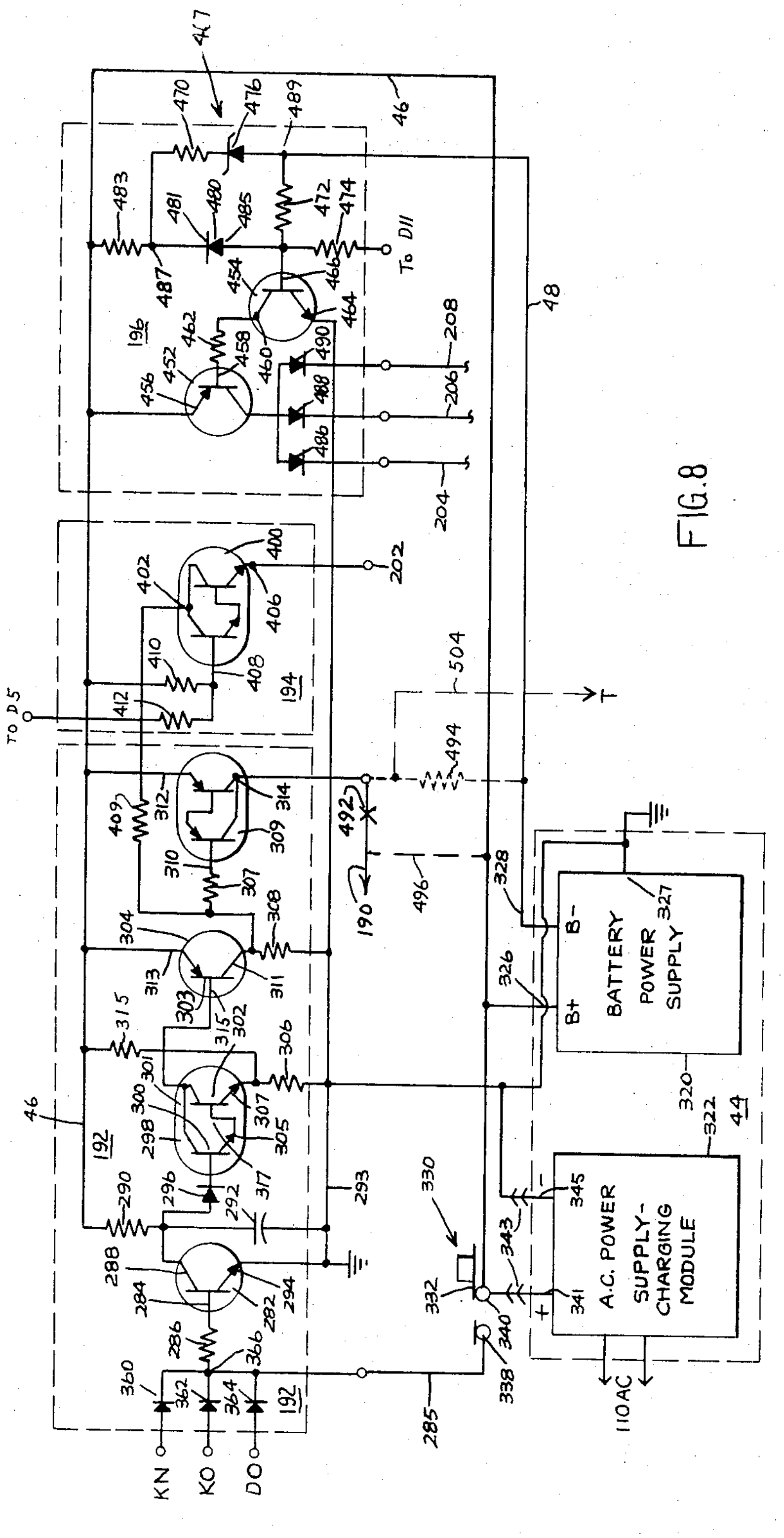
FIG. 8 is an electrical schematic of the blanking, "power-on" indicating and "low voltage" detecting circuits of the display.

Referring now to FIG. 8, blanking circuit 192 includes a first blanking control transistor 282 which has its base 284 coupled to a "floating" B+ supply buss 285 via a load resistor 286. Collector 288 of transistor 282 is coupled to B+ supply buss 46 via a resistor 290 and is coupled to ground 169 via a charging capacitor 292. The emitter 294 of transistor 282 is grounded. When a positive direct current potential is applied to base 284, transistor 282 will be rendered conductive whereby it bypasses charging capacitor 292 coupling both terminals thereof to ground 293. Conversely, if base 284 is not maintained at a positive potential, transistor 282 will be rendered non-conductive whereby a charging current will flow through resistor 290 to charge capacitor 292. Coupled to the collector 288 of transistor 282 via a blocking diode 296 is a double transistor 298 which includes two internal transistors 300, 302 which are coupled together such that they operate between conductive and non-conductive states in unison. The commonly connected collectors 301 of internal transistors 300, 302 are coupled to the base 303 of a second blanking transistor 304. Emitter 307 is coupled between ground 293 and B+ buss 46 via voltage divider resistors 306, 315, respectively. Emitter 305 is coupled to base 317. The collector 311 of transistor 304 is also coupled to ground via a resistor 308, and the emitter 313 thereof is connected to B+ supply buss 46.

A second double transistor 309 has its base 310 coupled to the collector 311 of transistor 304 via resistor 307, its emitter terminal 312 being coupled to B+ supply buss 46 and its common collectors 314 to supply buss 190 (see FIGS. 6 nd 9) which are coupled to the segment driver amplifiers 172 through 186 as described above.

Before explaining the operation of the display blanking circuit, a description of specific features of power supply 44 will be presented. Power supply 44 includes two modules these being a battery energized module 320 and an alternating current charging module 322. Module 320 includes as its primary source of power a plurality of batteries (not shown) having a positive terminal 326, ground terminal 327, and negative terminal 328. A two position switch 330 has an armature 332, a fixed contact 340 connected to battery terminal 326, another fixed contact 338 coupled to "floating" B+ buss 285.

Also connected to terminal 340 is the positive terminal 341 of an alternating current (AC) energized, direct current output power supply which, in conventional manner, functions as a charging module for battery supply module 320 to which it is selectively coupled via plug 343 and as an alternate power supply for operating the calculator circuit 10 from conventional "wall" AC power outlets.

The negative output terminal 345 of charging module 322 is coupled to ground terminal 327.

When switch 330 is closed, i.e., has it armature 332 coupled between terminals 338 and 340, "floating" buss 285 will be coupled to battery terminal 326. Conversely, when switch 332 is "open", "floating" buss 285 is electrically disconnected from both the charging module 322 and battery module 320 whereby the voltage level of "floating" buss 285 will be permitted to drift or float.

When switch 330 is in the latter position, direct current will still be applied from charging module 322 to battery module 320 to charge the batteries therein. With switch 330 in the latter position, charging module 322 may be removed.

Internally of battery module 320 is a circuit or batteries for generating a negative (B−) supply potential at B− terminal 328.

Referring again to the display blanking circuit 192, it will now be apparent that when switch 330 is closed, a positive voltage potential will be applied to "floating" buss 285. This positive potential will in turn be applied to first blanking transistor 282 rendering it conductive. In response to a conductive state of transistor 282, double transistor 298, second blanking transistor 304, and second double transistor 309 will all be rendered non-conductive, non-conductive, and conductive, respectively. In this case, B+ supply buss 46 will be coupled to segment drivers 172 through 186 via buss 190.

Conversely, when switch 330 is "open", floating buss 285 is no longer held at a positive potential but rather floats. This floating of buss 285 renders transistor 282 non-conductive. This in turn causes a charging current to flow through resistor 290 thereby building up a positive charge on capacitor 292. When the charge on capacitor 292 reaches a predetermined level, transistors 298, 304, and 309 will be rendered conductive, conductive, and non-conductive, respectively. The period of time required to turn "off" transistor 309 will depend upon the values of charging resistor 290 and charging capacitor 292.

After this time period, i.e., the time period determined by resistor 290 and capacitor 292 (e.g., 15 seconds), transistor 282 is rendered non-conductive thereby removing B+ potential from the segment drivers 172 through 186, whereby the combinations of signals appearing on output terminals 16 of calculator chip 12 will not be applied to the segments 86a through 86h of the "chips" 130 through 146. Correspondingly, after this predetermined period of time the "chips" 130 through 146 will remain extinguished.

To provide a means for re-illuminating or energizing the display chips 130 through 146, the base 284 of transistor 282 is coupled to input signal lines KN, KO, and DO via blocking diodes 360, 362, and 364, respectively. Specifically, the cathodes of blocking diodes 360, 362 and 364 and 114 are connected in common as at 366 to the base 284 via resistor 286. It will now be apparent that depression of the "D" switch, or any of the other switches of switch matrix 30 (FIG. 7) with the exception of the "K" switch will apply one of the signals appearing on the terminals of group 14 to the base of transistor 282. This pulse will render transistor 282 conductive thereby discharging capacitor 292. The conductivity states of the other transistors 298, 304 and 309 now change and result in B+ voltage being applied to buss 190. When the aforementioned depressed switch is released, the positive pulses will no longer be applied to transistor 282 whereby it will again be rendered non-conductive, and after a predetermined period of time (and assuming that the calculator circuit is operating on the battery module 320), B+ potential will be removed from the sement drivers 172 through 186 when the capacitor 292 becomes charged again and transistor 309 cuts "off".

It will now be seen that the blanking circuit 192 limits the period of time the display "chips" 130 through 146 will remain illuminated between manipulations of the switches of switch matrix 30 and when the calculator circuit 10 is being operated on its battery supply 320. That is, if none of the switches of switch matrix 30 are depressed for a period of time (determined by resistor 290 and charging capacitor 292), the luminescing display "chips" 130 through 146 will extinguish. However, depression of the "D" switch or any of the other switches of switch matrix 30 will again illuminate the display chips 130 through 146.

It will be observed that the "D" switch of switch matrix 30 is not coupled to any of input terminals KO, KN, or KQ whereby depression of the "D" switch does not effect any change in the previously appearing display.

Thus, "D" button performs no other function except the application of a positive pulse signal to the base of transistor 282. Therefore, when the display chips 130 through 146 are re-illuminated by means of switch "D", no change in the decimal digits being displayed on the chips 130 through 146 will be effected. On the other hand, if a numerical switch or function switch of switch matrix 30 is depressed, the display on display chips 130 through 146 will change in accordance with the new entry.

By reason of this novel circuit, the calculator display is automatically extinguished after a brief period of time (in a specific embodiment this is about 15 seconds) thereby substantially reducing the drain on the battery power supply module 320. At the same time, when an operator resumes use of the calculator, depression of either the D switch or the entry of new data or functions via switch matrix 30 switches immediately re-illuminates the display panel. Thus, it is again seen that the display-blanking circuit provides a unique and effective means for conserving power in the calculator circuit 10 without any reduction in the ease of operation thereof.

"Power-on" indicator circuit 194 includes a third double transistor 400 which has its collector terminal 402 coupled to the collector 311 via resistor 409, its emitter 406 coupled to the 86g segments of all of the "chips" 130 through 146 via terminal 202 (see FIG. 6), and its base 408 coupled to buss 46 via a resistor 410 and to the D5 terminal of group 14 via a resistor 412. In operation, transistor 400 is rendered conductive and non-conductive concurrently with change in conductivity states of transistor 304.

Accordingly, it will now be apparent that when transistor 304 becomes conductive, (this occurring when the display "chips" 130 through 146 have been extinguished), transistor 400 will be rendered conductive thereby applying the pulse signals D5 to the 86g segments. Simultaneously, the D5 signals will be applied to the substrate of display "chip" 138 via driver amplifier 158. Accordingly, the segment 86g of "chip" 138 will be illuminated. The illumination of this single segment provides a visible indication that the calculator circuit is turned "on", but does so only when all of the display "chips" have been extinguished by the display blanking circuit 192. Similarly, since the blanking circuit 192 only extinguishes the segments 130 through 146 when the calculator circuit 10 is being operated on the battery supply module 320, the power-on indicator circuit 194 only functions to illuminate the single segment aforementioned when the calculator circuit is being operated from its battery supply.

By reason of this circuitry, the need for a separate "power-on" indicator light is eliminated. Further, "power-on" indication is effected by means of a single LED segment which requires minimal power, the segment being utilized twofold, once in the alpha-numeric display and again for the "power-on" indicator. The "power-on" indicator 194 further provides a convenient means for warning an operator that the calculator circuit has been left "on" when all of the "chips" 130 through 146 have been extinguished. The fact that the calculator circuit 10 is turned "on" is readily apparent at all other times, since one or more of the "chips" 130 through 146 will be illuminated with a decimal digit. When the calculator is being operated from a 110 volt AC source, the need to conserve battery energy is obviated and the blanking circuit 192 and "power-on" indicator circuit 194 are inoperative.

Low battery detector circuit 196 (FIG. 8) includes first and second detector transistors 452, 454. Transistor 452 has its emitter 456 coupled to the B+ buss 46 and its base 458 coupled to the collector 460 of transistor 454 via a resistor 462. The emitter 464 of transistor 454 is coupled to ground 293. Connected between B+ supply buss 46 and B− supply buss 48 is a voltage dividing network including series connected resistors 470 and 483 and zener diode 476. A diode 480 couples the base 466 of transistor 454 to terminal 487 between resistors 470 and 483. A load resistor 472 is coupled between base 466 and B− buss 48, and a load resistor 474 is coupled between the base 466 and input signal terminal D11.

In operation, and assuming that the calculator circuit is operating from the battery 320 and that the charge is sufficient to maintain the potential of the B+ and B− supplies above the minimum voltage required for operating the calculator circuit, a small negative potential will be applied at terminal 487. Simultaneously, input signals D11 are applied to the base 466 of transistor 454. Under these conditions, the negative potential at terminal 487 is sufficiently negative to "clamp" or maintain the base 466 negative with respect to ground potential (FIG. 6). However, as the charge on the batteries 320 decreases, the negative potential at terminal 487 decreases toward ground voltage. At a point in this decrease, the negative bias on the base 466 will become insufficient to maintain the base 466 negative with respect to ground when input signal D11 is simultaneously applied thereto via resistor 474. When this occurs the positive polarity of input signal D11 will produce a biasing current at the base 466. Each succeeding input signal D11 will momentarily forward bias transistor 454. Thus biased, it becomes conductive, and permits a current to flow therethrough via resistor 462 and the base 458 of transistor 452. This in turn, forward biases the transistor 452 rendering it conductive.

When transistor 452 becomes conductive, current flows through the emitter-collector circuit thereof and through diodes 486, 488, and 490. This current in turn flows, via signal lines 204, 206, and 208, to segments 86*d*, 86*e*, and 86*f* of all of the display elements 130 through 146. Simultaneously, input signal D11 is being applied to the substrate of chip 146 as explained above. The simultaneous occurrence of these signals in turn causes illumination of the 86*d*, 86*e*, and 86*f* segments of display chip 146 thereby illuminating the alphabetic character "L". This symbol thus provides a visual indication that the charge on the batteries in the battery power supply module 320 has fallen below that required to operate the calculator circuit 10. It will again be observed that the low battery indicator circuit operates intermittently, i.e., is pulsed "on" and "off" in synchronism with signal D11, and utilizes portions of one of the display devices thereby obviating the need for a separate battery charge indicator or additional display elements. Further, it will be observed that the majority of the current flowing through the low battery detector circuit, specifically, the current flowing through the collector-emitter circuits of transistors 452 and 454, does not flow unless the charge on the batteries falls below the required operating potential. Further, substantially all of the current flowing through the low voltage detector circuit 196 flows through the collector-emitter circuit of transistor 452 and in turn through the respective display device 146 coupled to respond thereto thereby minimizing the power loss or load imposed upon the battery by minimizing the current used for functions other than illuminating the display segments. When the charge on the batteries of power supply module 320 is sufficient to maintain the voltage on B− supply buss 48 at the potential required for proper calculator operation, the low battery detector circuit 196 is cut "off". Similarly, when the calculator is operating from an external 110 volt AC source via module 322, the low battery indicator 196 is "off".

Referring again to FIGS. 8 and 9, a modification of the blanking circuit 192 is shown in dashed lines. In this embodiment, the blanking circuit 192 functions to disable the digit driver amplifiers 150 through 166 rather than disabling the segment driver amplifiers 172 through 186. To effect this change, the connection from the collector 314 of transistor 302 to supply buss 190 is broken as indicated by the "*x*" 492, and collector 314 is coupled to B− supply buss 48 via a load resistor 494. Supply buss 190 is in turn connected directly to B+ supply buss 46 via a conductor 496.

Digit driver amplifiers 150 through 166 have resistor 238 removed therefrom as indicated by the "*x*" marks 501 in FIG. 9, and the connection between the base 224 of transistor 222 and resistor 242 is broken as indicated by the "*x*" 498. Lastly, collector 244 of transistor 220 is coupled to the base 314 via terminal 190 (FIG. 8) to transistor 309 via a conductor 504 (FIGS. 8 and 9).

In operation, when blanking circuit 192 is "on", blanking transistor 302 is conductive whereby current flows through the collector-emitter circuit (312 through 314) thereof and through resistor 494 to B− supply buss 48. This current flow through resistor 494 produces a potential on conductor 504 which is positive with respect to B− supply buss 48. This potential is applied to the base 244 of transistor 220 of digit driver 150 via resistor 242. This potential, however, is a threshold biasing signal and is not sufficiently positive to render transistor 220 conductive.

Simultaneously with the application of a positive potential to base 244 via conductor 504, input signals D1 through D9 are intermittently applied to the bases 244 of digit driver transistors 220 via resistors 240. Signals D1 through D9 are also positive and are added to the threshold biasing signal on conductor 504. The combined potentials, increase the potential on base 244 sufficiently to render the respective transistor 220 conductive. (It should be observed that positive supply potential for transistor 220 is now received via segment driver amplifiers 172 through 186 and LED display devices 130). As described above, when transistor 220 is rendered conductive, it in turn applies the required base current to transistor 222 rendering it conductive whereby the display devices 130 are illuminated.

Conversely, when blanking circuit 192 is "off", transistor 302 thereof is rendered non-conductive. In this situation, no current flows through resistor 494 whereby the threshold potential on conductor 504 assumes the potential on B−supply buss 48. B−supply potential is therefore applied, via resistor 242, to the base 244 of transistor 220 of digit driver amplifiers 150 through 166. This negative biasing of the bases 244 reduces the threshold potential at base 244 sufficiently to prevent the input signals D1 through D9 from forward biasing transistor 220 whereby transistor 222 of digit driver amplifiers 150 through 166 remains "off" and prevents the flow of current through the display devices 130.

It will be observed that this modified blanking circuitry still retains all of the advantages of the previously described blanking circuit which operated to extinguish the display devices 130 via the segment driver amplifiers 172 through 186. Specifically, in this circuit, all of the current flowing through the digit driver amplifiers 150 through 166, i.e., the supply current flowing therethrough via the LED common terminals 169 and the control signal current flowing therethrough via resistor 240, flows through the LED display devices 130. Of the two embodiments for the blanking circuit, the first described circuit is more readily adapted for manufacture as an integrated circuit.

In summary, the present invention provides a unique and novel display circuit for use with a calculator circuit which is operated from a battery energized power supply. The display circuit includes segment driver amplifiers and digit driver amplifiers which are connected electrically in series with luminescing display devices in such a way that the display devices are repetitively and momentarily illuminated and wherein substantially all of the current flowing through the amplifier circuits flows through the display devices. By reason of this circuitry, power consumption of the display circuit is minimized since both the load and control signal current flowing through the amplifier circuits are utilized for illumination of the display devices.

The display circuit also includes novel "power-on" and "low voltage" indicator circuits which provide for visible indication of these important parameters. The "power-on" circuit utilizes portions of the display devices used for displaying the values of data entires and results, and operates only when the display devices have otherwise been extinguished by the blanking circuit. The low voltage indicator similarly utilizes portions of the data display devices, operates in a pulsed mode, and consumes a minimum of power when the calculator circuit is operative and the charge on the batteries is sufficient for the operation thereof. In a specific working embodiment of the invention the following component values were used:

| | |
|---|---|
| Computing Circuit | Texas Instruments MOS/LSI integrated circuit TMS0103NC |
| Transistors (all) | 2N3904 |
| Diodes (all) | 1N4148 |
| Resistors ¼ watt 5% 229 | |
| 238 | |
| 240 | |
| 258 | 150 ohms (may be selected to equalize display brightness) |
| 264 | |
| 265 | |
| 286 | 100K ohms |
| 290 | 3.3 Meg. ohms |
| 305 | 10K ohms |
| 306 | 6.8K ohms |
| 307 | 18K ohms |
| 308 | 150 ohms (may be selected to |
| 309 | equalize display brightness) |
| 410 | 680K ohms |
| 412 | 100K ohms |
| 462 | 10K ohms |
| 470 | 750 ohms |
| 472 | 330K ohms |
| 474 | 100K ohms |
| 483 | 10K ohms 5% |
| 494 | |
| Capacitor 292 | 6.5 mfd, 15 volts |
| Power Supply outputs | B+ + 7.2 volts D.C., m.a. |
| | B− − 7.2 volts D.C., m.a. |
| Clock Pulse Generator 40 | pulses per second |
| Digit driver amplifiers 150 through 166 (alternate) | Texas Instruments Integrated Circuit SN25392 or SN75492 |
| Segment Driver Amplifiers 172 through 186 | Texas Instruments Integrated Circuit SN25391 or SN75491 |
| LED Display Devices (all) | Bowmar/Acton |

While there have been described above the principles of this invention in connection with specific apparatus, it is to be clearly understood that this description is made only by way of example and not as a limitation to the scope of the invention.

What I claim is:

1. An electronic calculator comprising a. clock pulse generating means;

b. computing circuit means having first, second and third groups of computing circuit terminals, and a clock pulse terminal coupled to said clock pulse generating means, said computer circuit means generating a repeating sequential series of pulses at said first group of computing circuit terminals in timed relation with the pulses generated by said clock pulse generating means, c. keyboard means including character and function keys and respective switches operated thereby, said switches being connected in controlling relation to the first and second groups of computing circuit terminals of said computing circuit means, said keyboard means selectively coupling computing circuit terminals within said first group to computing circuit terminals within said second group in accordance with the positions of said switches, and d. display circuit means comprising light emitting elements and having first and second groups of display input terminals coupled to the first and third groups of computing circuit terminals, respectively, of said computing circuit means, said computing circuit means generating pulses at selected terminals of said third group of computing circuit terminals simultaneously with the generation of each pulse at a terminal of said first group of computing circuit terminals, said light emitting elements being selectively energized in accordance with the pulses applied by said computing circuit means to the first and second groups of display input terminals.

2. An electronic calculator according to claim 1 in which the pulses supplied to said display input terminals occur at such a frequency as to prevent optically perceptible flickering of the light emitted by said light emitting devices.

3. An electronic calculator according to claim 1 in which the pulses at said first group of computing circuit terminals are supplied sequentially to the said switches actuated by said character keys at a frequency such that an entire series of said pulses is generated during the period of actuating of any said character key.

4. An electronic calculator according to claim 1 in which each light emitting element has an anode side and a cathode side, the pulses at said first group of computing circuit terminals being supplied to one of said sides and the pulses at said third group of computing circuit terminals being supplied to the other of said sides, and amplifier drivers connected to the respective sides of said light emitting elements and through which said pulses are supplied to said light emitting elements.

5. An electronic calculator according to Claim 4 in which the side of each light emitting element to which the pulses at said third group of computing circuit terminals is supplied comprises a plurality of segments, the segments of each said light emitting element being electrically connected to the corresponding segment of the others of said light emitting elements, a respective amplifier driver for each group of interconnected segments, and means for supplying respective pulses from the pulses at said third group of computing circuit terminals to respective ones of the amplifier drivers for said segments.

6. An electronic calculator according to claim 1 in which each light emitting element has an anode side and a cathode side, the pulses at said first group of computing circuit terminals being supplied to one of said sides and the pulses at said third group of computing circuit terminals being supplied to the other of said sides.

7. An electronic calculator according to claim 6 in which the side of each light emitting element to which the pulses at said third group of computing circuit terminals are supplied comprising a plurality of segments, the segments of each said light emitting element being electrically connected to the corresponding segment of the others of said light emitting elements, and means for supplying respective pulses from the pulses at said third group of computing circuit terminals to respective ones of said groups of interconnected segments.

8. An electronic calculator according to claim 7 which includes amplifier drivers interposed between the opposite sides of said light emitting elements and the sources of pulses therefor.

9. An electronic calculator according to claim 6 which includes amplifier drivers interposed between the opposite sides of said light emitting elements and the sources of pulses therefor.

10. An electronic calculator comprising a. computing circuit means having an input, said means generating a repeating series of first pulses and a group of second pulses simultaneously with each of said first pulses, b. switching means coupled to said computing circuit means for receiving said repeating series of first pulses and selectively coupling said first pulses to the input of said computing circuit means, c. display circuit means comprising light emitting elements, each having a common element and a plurality of segment elements, and d. means coupling said light emitting elements to said computing circuit means, the common elements of said light emitting elements receiving said series of first pulses and said segment elements receiving said group of second pulses.

11. The method of operating an electronic calculator including a computing circuit means having first, second and third groups of terminals, keyboard means having key actuated control switches, and display circuit means comprising electrically actuated light emitting elements each having a common element and a plurality of segment elements, said method comprising the steps of a. generating a repeating series of first sequential pulses at the first group of terminals of said computing circuit means, b. generating a group of second pulses at the third group of terminals of said computing circuit means simultaneously with each of said first pulses, c. supplying said first sequential pulses to the second group of terminals of said computing circuit means through said keyboard means for the control of said computing circuit means, said first sequential pulses being generated at a rate such than an entire series of first sequential pulses is generated during the interval of actuation of a single one of said switches, d. supplying said first sequential pulses to the common elements of said light emitting elements, and e. supplying said second pulses to selected segment elements of said light emitting elements, said first and second pulses energizing segment elements of said light emitting elements in accordance with said group of second pulses.

* * * * *

UNITED STATES PATENT OFFICE
CERTIFICATE OF CORRECTION

Patent No. 3,781,852 Dated December 25, 1973

Inventor(s) Edward A. White et al.

It is certified that error appears in the above-identified patent and that said Letters Patent are hereby corrected as shown below:

Column 10, line 61, delete "th" and insert -- the --.

Column 11, line 35, delete "220" and insert -- 222 --.

Column 13, line 43, delete "nd" and insert -- and --.

Signed and sealed this 21st day of May 1974.

(SEAL)
Attest:

EDWARD M. FLETCHER, JR.
Attesting Officer

C. MARSHALL DANN
Commissioner of Patents

USCOMM-DC 60376-P69
☆ U.S. GOVERNMENT PRINTING OFFICE : 1969 O—366-334.

Dedication 3,781,852.—*Edward A. White*, Fort Wayne, Ind., and *James H. Bunting*, Acton, Mass. CALCULATOR DISPLAY CIRCUIT. Patent dated Dec. 25, 1973. Dedication filed Dec. 2, 1976, by the assignee, *Bowmar Instrument Corporation*.

Hereby dedicates to the Public the entire term of said patent.

[*Official Gazette May 24, 1977.*]

Notice of Adverse Decision in Interference

In Interference No. 98,950, involving Patent No. 3,781,852, E. A. White, and J. H. Bunting, CALCULATOR DISPLAY CIRCUIT, final judgment adverse to the patentees was rendered Feb. 25, 1977, as to claims 1–11.

[*Official Gazette July 5, 1977.*]